United States Patent [19]
Shearer

[11] 3,785,678
[45] Jan. 15, 1974

[54] COUPLER DEVICE FOR A CART
[75] Inventor: John Marshal Shearer, Loveland, Ohio
[73] Assignee: Leyman Manufacturing Corporation, Cincinnati, Ohio
[22] Filed: Sept. 29, 1972
[21] Appl. No.: 293,327

[52] U.S. Cl. .............................. 280/491 B, 280/408
[51] Int. Cl. ............................................... B60d 1/02
[58] Field of Search .................... 280/491 B, 491 R

[56] References Cited
UNITED STATES PATENTS
2,513,258   6/1950   Ulrich ............................ 280/491 B
2,527,155   10/1950  Schlenz .......................... 280/491 B Primary Examiner—Leo Friaglia
Attorney—James S. Hight et al.

[57] ABSTRACT

The coupler device includes a hitch bar that is movable between an extended position where same is aligned with the centerline of the cart, and a retracted position where same is skewed relative to the centerline of the cart. A hitch pin is mounted to and depends from each end of the bar. When in the extended position the front hitch pin is adapted to interconnect with a forward cart in a coupling attitude, and the rear hitch pin locks the hitch bar to the cart. When in the retracted position the front hitch pin locks the hitch bar in a storage attitude where the coupler is totally recessed beyond the leading edge of the cart. The coupler device also includes a pivot arm fixed to the hitch bar at one end and pivotally connected to the cart's frame at the other end, the pivot point being substantially removed from the cart's centerline but closely adjacent the cart's leading edge. Thus, the hitch bar may be pivoted between the extended and retracted positions about the pivot point while remaining attached to the cart at all times.

3 Claims, 6 Drawing Figures

PATENTED JAN 15 1974 3,785,678
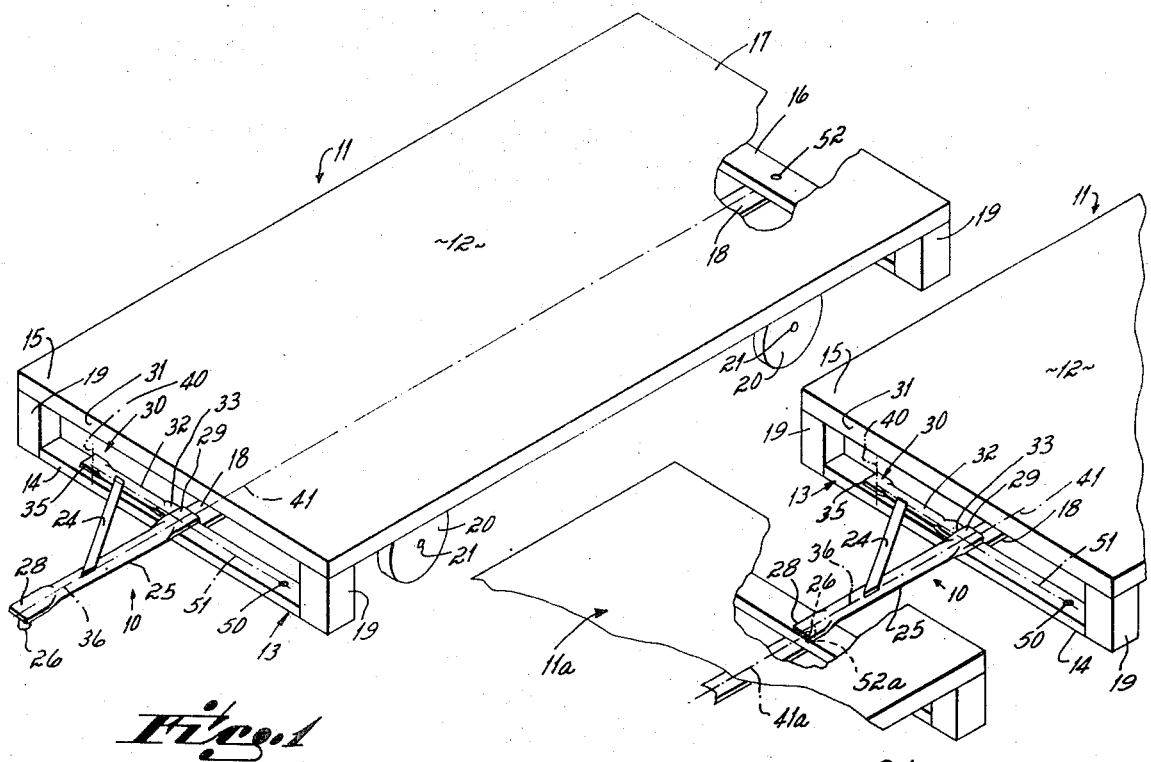
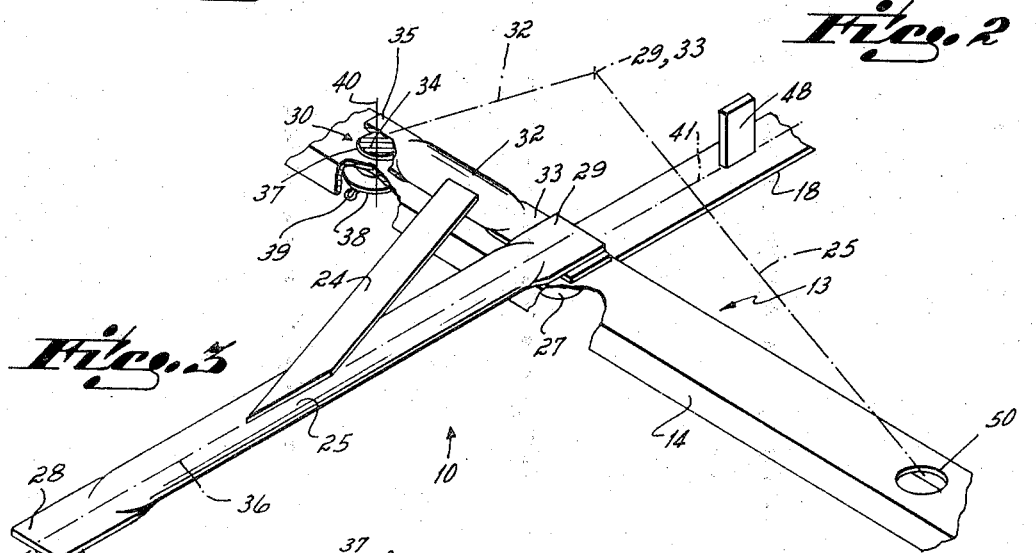
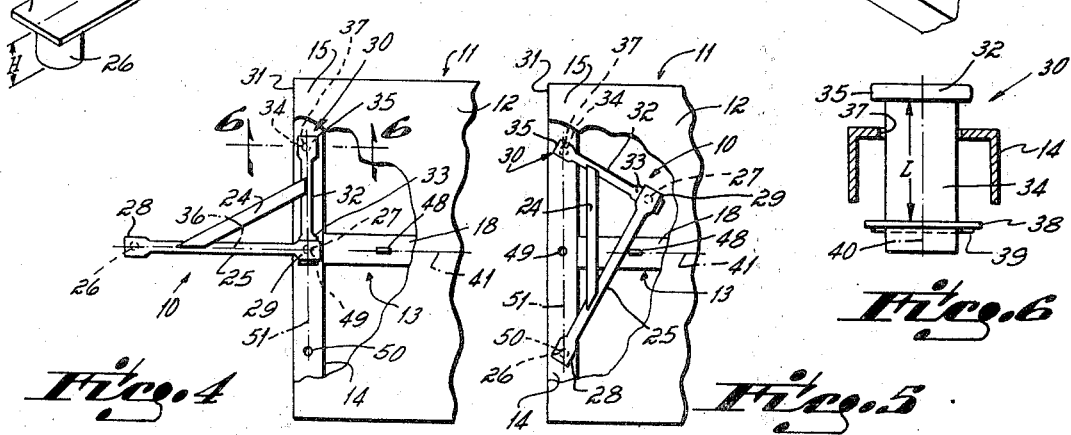

COUPLER DEVICE FOR A CART

This invention relates generally to carts. More particularly, this invention relates to a novel coupler device for a cart.

A cart, for the purposes of this application, is deemed to include wagons, carriages, hand trucks, pushcarts and other type vehicles that are non-motorized and that are supported by a two, three or four-wheel suspension system.

Carts are, of course, used extensively in industry in the transporting of goods from one location to another. Such carts generally find wide use in warehousing operations where they are used to shift the location of stored goods from one place to another within the warehouse, or to load and unload goods from vehicles such as railroad freight cars and highway tractor trailers. Further, such carts generally find wide use in major manufacturing facilities where they are widely used to transport goods from a storage location to a work station, or between storage locations, or between work stations. Still further, such carts are widely used in major retail facilities, e.g., supermarkets, where they are used to transport goods from a storage location to a sales or retail shelf location.

A typical type prior art cart is that which is structured to include a flat bed provided with either a three or four-wheel suspension system. Of course, the bed allows the goods to be stacked thereon, and the wheels allow the cart to be easily rolled or pushed from one location to another. Such a cart is often provided with end frames, i.e., front and rear walls, which extend upwardly from the bed of the truck, the side walls being essentially open for easy loading and unloading of the cart. The end frames, of course, prevent the goods from being thrown off the front or rear of the truck when the cart is stopped or started, respectively, in a jerky kind of fashion.

It is known, in combination with such carts of the prior art, to provide a coupler device for a cart. This enables a plurality of similar carts to be coupled together, and then pulled in train-like fashion by a motorized vehicle. Generally speaking, the main structure of such a coupler device is located at the head or front end of the cart. The coupler device is especially adapted for interconnection with suitable structure at the tail or rear end of a similar cart, thereby allowing a plurality of the carts to be interconnected in train-like fashion. The train of carts may then be pulled around a warehouse, or a manufacturing or retail facility, by a motorized vehicle such as, e.g., a work truck especially designed for that purpose. This provides economy of capital equipment in that only one motorized vehicle is required to service a multiplicity of carts.

In the use of such carts as are known to the prior art, it has been found desirable to provide a coupler device that retracts completely back underneath the bed of the cart, i.e., that retracts beyond the leading edge of the cart, at certain periods of use. This is particularly true, for example, when the carts are not interconnected together in train-like fashion, i.e., when the carts are being pushed around individually by an operator, or when the carts are being transported from place to place in a closely confined area such as, e.g., a highway tractor trailer.

Retractable coupler devices which solve this basic problem are known to the prior art. However, all retractable coupler devices of which I am aware move in a generally linear fashion between the extended or coupling position, and the retracted or recessed position. This linear movement is generally coaxial with the center axis of the cart. Such a linear, or direct line, reciprocation type motion between extended and retracted positions means that a substantial free area must be provided underneath the cart behind the cart's leading edge to receive the coupler device in the retracted or storage position. Further, such retractable hitching devices known to the prior art are generally relatively complex in structure, thereby making their maintenance relatively difficult and their initial manufacture relatively expensive. Typical coupler devices as are known to the prior art are illustrated in U.S. Pat. Nos. 1,582,045, 2,195,636, 2,896,969, 3,287,026, 3,572,764 and German Pat. No. 375,840.

It has been one objective of this invention to provide a novel coupler device particularly adapted for use with a cart that is adapted to move in a pivotal fashion (as opposed to a linear fashion) between an extended or coupling position and a retracted or storage position so as to require a minimum storage area or space beneath the cart's bed.

It has been another objective of this invention to provide a novel coupler device particularly adapted for use with a cart that is of simple structure, easy to fabricate, and maintenance free.

In light of these objectives, the coupler device for a cart of this invention includes a hitch bar that is movable between an extended position where same is aligned with the centerline of the cart, and a retracted position where same is skewed relative to the centerline of the cart. A hitch pin is mounted to and depends from each end of the bar. When in the extended position the front hitch pin is adapted to interconnect with a forward cart in a coupling attitude and the rear hitch pin locks the hitch bar to the cart. When in the retracted position the front hitch pin locks the hitch bar in a storage attitude where the coupler is totally recessed beyond the leading edge of the cart. The coupler device also includes a pivot arm fixed to the hitch bar at one end and pivotally connected to the cart's frame at the other end, the pivot point being substantially removed from the cart's centerline but closely adjacent the cart's leading edge. Thus, the hitch bar may be pivoted between the extended and retracted positions about the pivot point while remaining attached to the cart at all times.

Other objectives and advantages of this invention will be more readily apparent from the following detailed description taken in conjunction with the drawings in which:

FIG. 1 is a top perspective view illustrating a coupler device in accord with the principles of this invention, same being mounted to a flat bed type cart and being located in the extended or coupling position;

FIG. 2 is a view similar to FIG. 1, but illustrating two carts attached together in train-like fashion by the coupler device of this invention;

FIG. 3 is a perspective view illustrating the coupler device of this invention in combination with a section of the cart's frame (partially broken away for clarity);

FIG. 4 is a top view of the cart's front end with the coupler device extended as illustrated in FIG. 1, the cart's bed being broken away for clarity;

FIG. 5 is a top view similar to FIG. 4, but illustrating the coupler device in the retracted or storage position; and FIG. 6 is a cross-sectional view taken along line 6—6 of FIG. 4 illustrating the pivotal interconnection of the coupler device with the cart's frame.

A coupler device 10 in accord with the principles of this invention is particularly adapted for use with a cart 11 of the kind especially useful in warehouses and the like, see FIG. 1. The cart 11, as shown in FIG. 1, comprises a flat bed 12 supported on a chassis or frame 13. The frame 13 includes a crossbar 14 at the head or leading end 15 of the cart, and a crossbar 16 at the tail or trailing end 17 of the cart. The crossbars 14, 16 are connected to a ridge bar 18 running the length of the cart. The crossbar 14,16/ridge bar 18 chassis or frame 13 is located beneath the cart's bed 12, the bed being supported thereon at each of its four corners by posts 19. The posts 19 are fixed to the ends of the crossbars 14, 16 and to the bed 12, thereby making an integral, one-piece unit. A four-wheel 20 suspension system is provided the bed 12/frame 13 combination, the axles 21 for the wheels being connected to the frame 13 by bearing blocks (not shown).

The structure of the coupler device 10 of this invention is particularly illustrated in FIGS. 3 and 6, and the two functional attitudes or positions of the coupler device are particularly illustrated in FIGS. 4 and 5. With regard to the structure of the coupler device 10, same includes a hitch bar 25 that is in the nature of a straight bar, i.e., is straight in configuration. The hitch bar 25 mounts hitch pins 26, 27 at the front end 28 and rear end 29, respectively. The hitch pins 26, 27 depend downwardly (relative to ground) from the ends 28, 29 of the hitch bar.

The hitch bar 25 is pivotally mounted, as at 30, to the cart's front crossbar 14 beneath the cart's bed 12, i.e., behind the leading edge 31 of the cart 11. The pivotal mounting 30 is particularly illustrated in FIGS. 3 and 6, and is accomplished through use of pivot arm 32. The pivot arm 32 (which is straight in configuration) is fixed to the rear end 29 of the hitch bar 25 at one end 33, the pivot arm being fixed normal to the hitch bar's axis 36. A pivot post 34 that depends downwardly (relative to ground) is mounted to the other end 35 of the hitch bar 25. A reinforcing strap 24 is fixed at one end to the pivot arm 32 and at the other end to the hitch bar 25, the reinforcing strap being fixed approximately centrally of the pivot arm and the hitch bar to insure that the pivot arm/hitch bar structure retains its L-shaped configuration during use.

The pivot post 34 is received in free rotating relation within a hole 37 defined in the cart's front crossbar 14. The pivot post 34 is of substantially greater axial length L than the axial length H of the hitch pins 26, 27 (each of the hitch pins 26, 27 being substantially identical in form to the other). Note that the pivot axis 40 of the post 34 is, in essence, the pivot axis of the hitch bar 25; this pivot axis 40 is substantially removed from the cart's centerline 41, but is closely adjacent the cart's leading edge 31. The pivot post is retained in functional pivoting relation with the cart's front crossbar 14 by means of a washer 38 and cotter pin 39 located beneath the crossbar as shown in FIG. 6. Thus, the coupler device 10 is in the nature of an L-shaped structural member which is permanently and pivotally connected to the cart's frame 13 at the free end 35 of the short leg 32, and which is provided with hitch pins 26, 27 at the free end 28 of the long leg 25 and at the juncture 33, 29 of the short and long legs, respectively.

The two hitch pins 26, 27 at either end of the hitch bar 25 are adapted to cooperate with pin holes 49, 50 in the cart's front crossbar 14. The first hole 49 is formed in the crossbar 14 so that its center falls on the cart's centerline 41, and the second hole 50 is formed in the crossbar 14 on that side of the centerline hole 49 which is opposite to the pivot hole 37. The pivot hole 37 in the crossbar 14 is, of course, formed therein a distance from the centerline hole 49 substantially equal to the length of the pivot arm 32. However, the pin hole 50 is formed in the crossbar 14 a distance from the centerline hole 49 substantially less than the length of the hitch bar 25. Note that the centers of the three holes 37, 49 and 50 all fall on the same line 51.

The function of the centerline hole 49 is to receive rear hitch pin 27 when the hitch bar 25 is in the extended attitude illustrated in FIG. 4. By positioning rear hitch pin 27 in the centerline hole 49, pivotal motion of the coupler device about pivot axis 40 is restrained, thereby allowing the cart to be hitched or coupled to another cart in front thereof so that same follows the travel path of the forward cart without wandering. Further in this regard, front hitch pin 26 is adapted to be received in a coupler hole 52 defined in the rear crossbar 16 of the forward cart 11a (and lying on that cart's central axis 41a) so that the carts can be connected together in train-like fashion when the hitch bar 25 is extended.

The pin hole 50 is adapted to receive the front hitch pin 26 when the hitch bar 25 is in the storage or retracted attitude. By receiving front pin 26 in pin hole 50 when the coupler device 10 is retracted, the coupler device cannot inadvertently come out from underneath the cart's bed into an extended or partially extended position. That is, such a pin 26/pin hole 50 latch on the hitch bar 25 in the retracted attitude prevents the coupler device 10 from inadvertently swinging outward if, e.g., the cart 11 is hit from the rear or otherwise, thereby acting as a safety feature which keeps the hitch bar in the storage position until use thereof in the extended position is desired by the operator.

As illustrated in the Figures, and when the coupler device 10 of this invention is in the extended or coupling attitude as shown in FIGS. 1–4, the centerline 36 of the hitch bar 25 lies on the centerline 41 of the cart 11. Further, the lead hitch pin 26 is substantially projected or extended forwardly beyond the leading edge 31 of the cart 11. When the coupler device is in the extended or coupling attitude, and because the hitch bar centerline 36 is the same as the cart's centerline 41 (and is rigidly retained in that orientation by hitch pin 27 being received in pin hole 49), the cart 11 will tend to follow the cart 11a in front of it (when a plurality of carts are hitched and pulled together in train-like fashion) without weaving from side to side. When the hitch bar 25 is in the retracted or storage attitude as shown in FIG. 5, the centerline 36 thereof is skewed or angulated relative to the cart's centerline 41. Further, the coupler device 10 is fully recessed beneath the cart's bed 11, i.e., behind the cart's leading edge 31, when the coupler device 10 is in the retracted or storage position as shown in FIG. 5. Note that the hitch bar 25 remains in substantially the same horizontal plane whether in the retracted attitude or in the extended attitude, and that the pivot point of the hitch bar is in substantially the same horizontal plane as the hitch bar itself. When in the storage or skewed attitude shown in FIG. 5, the hitch bar 25 is adapted to abut stop 48 mounted to the cart's ridge bar 18, thereby preventing further retracting motion of the hitch bar so that same does not recess too great a distance beneath the cart's bed 12 (which would make subsequent extension thereof difficult for the operator).

Of course, the hitch bar 25 is pivoted from the coaxial position with the cart's centerline 46 as illustrated in FIG. 4 to the skewed attitude relative to the cart's centerline as illustrated in FIG. 5 by pivoting same about vertical pivot axis 40 (also compare solid line position of coupler device 10 to phantom line position as shown in FIG. 3). Because the pivot post 34 is of substantially greater axial length L than the axial length H of the hitch pins 26, 27, the hitch bar 25 can be extended between extende and retracted positions. This for the reason that the rear hitch pin 27 (if the coupler device 10 is in the extended attitude) or the lead hitch pin 26 (if the coupler device is in the retracted attitude) can be easily removed from engagement with hole 49, 50, respectively, simply by manually lifting the pivot post 34 until washer 38 is closely adjacent the underside of the cart's front crossbar 14, see FIG. 6. Assuming the rest of the coupler device 10, i.e., the pivot arm 32 and hitch arm 25, is raised simultaneous therewtih, such will cause the respective hitch pin 26 or 27 in hitch hole 49 or 50 to be removed therefrom, thereby allowing the coupler device to be pivoted on axis 40.

In use, and assuming the coupler device 10 of this invention is to be moved from the retracted or storage attitude shown in FIG. 5 to the extended or coupling attitude shown in FIG. 4, the L-shaped member 25, 32 is grasped by an operator adjacent the lead hitch pin 26 and the pivot post 34. The L-shaped member 25, 32 simply is lifted upwardly until the lead hitch pin 26 clears the crossbar 14, i.e., until the lead hitch pin is removed from pin hole 50. At that point, the coupler device 10 is pivoted clockwise (referring to FIG. 3) until it is located with the trailing hitch pin 27 over pin hole 49 in crossbar 14. The trailing hitch pin 27 is then allowed to fall into the pin hole 49 by releasing the L-shaped member 25, 32, thereby positioning the coupler device 10 in the extended attitude shown in FIGS. 1, 3 and 4. In this extended attitude, lead hitch pin 26 may be positioned in pin hole 52a in the rear crossbar 16 of a similar cart located forwardly thereof to connect the carts in train-like fashion.

When it is desired to move the coupler device 10 from the extended attitude shown in FIG. 4 to the retracted attitude shown in FIG. 5, the L-shaped member 25, 32 is simply grasped by the operator once again adjacent the lead hitch pin 26 and the pivot post 34, and then lifted. This lifts rear hitch pin 27 out of hitch hole 49. The coupler device 10 is then simply pivoted about pivot axis 40 from the FIG. 4 attitude to the FIG. 5 attitude. Note that as the coupler device 10 achieves the FIG. 5 attitude, fixed stop 48 contacts hitch bar 25, thereby positioning same in that attitude where the lead hitch pin 26 can fall into pin hole 50 in the cart's front crossbar 14 when the coupler device is released.

It will be particularly noted that the coupler device 10 of this invention is not retracted in a linear fashion axially and rearwardly of the cart's structure. That is, the coupler device 10 of this invention is pivotally mounted so that same moves between an extended position and a retracted position in an arcuate type motion, see FIG. 3. The storage space required of this coupler device 10 structure beneath the cart 11 is substantially less than would be required were the hitch bar 25 to linearly retract back beneath the cart's bed 12.

Having described in detail the preferred embodiment of my invention, what I desire to claim and protect by Letters Patent is:

1. A coupler device for a cart comprising a hitch bar that is movable between an extended position where same is substantially aligned with the centerline of said cart and a retracted position where same is skewed relative to the centerline of said cart, said hitch bar being totally recessed beyond the leading edge of said cart when in the retracted position, hitch means in the form of a downwardly depending hitch pin mounted to each end of said bar, that hitch pin mounted to the hitch bar's front end being adapted to interconnect with a forward cart in a coupling attitude, and said hitch bar being rigidly held in the extended position by said rear hitch pin received in a first pin hole defined in the cart's frame and said hitch bar being held in the retracted position by one of said front and rear hitch pins received in a second pin hole defined in the cart's frame, and structural means pivotally connected to the cart's frame and also fixed to said hitch bar, said pivotal connection being removed from the cart's centerline and permitting said hitch bar to swing between the extended and retracted positions.

2. A coupler device for a cart as set forth in claim 1 wherein said pivotal connection provides a pivot point closely adjacent the cart's leading edge, wherein said structural means is in the form of a pivot arm fixed at the one end to said hitch bar and at the other end to a pivot post slidingly and pivotally received in the cart's frame, wherein said pivot post is of a length substantially greater than the length of either hitch pin, and wherein the axis of said pivot post is vertically oriented relative to the cart's bed.

3. A coupler device for a cart comprising a hitch bar that is movable between an extended position where same is substantially aligned with the centerline of said cart, and a retracted position where same is skewed relative to the centerline of said cart, hitch means mounted to each end of said bar, that hitch means mounted to the hitch bar's front end being adapted to interconnect with a forward cart in a coupling attitude, and that hitch means mounted to hitch bar's rear end being adapted to hold said hitch bar to said cart when said hitch bar is in the extended position, and a pivot arm fixed at the one end to said hitch bar and at the other end to a pivot post pivotally received in the cart's frame, said pivotal connection being closely adjacent the cart's leading edge, being removed from the cart's centerline, and permitting said hitch bar to swing between the extended and retracted positions.

* * * * *